US006976628B2

(12) United States Patent
Krupa

(10) Patent No.: US 6,976,628 B2
(45) Date of Patent: Dec. 20, 2005

(54) SYSTEM AND METHOD FOR ENSURING THE PROPER DISPENSATION OF PHARMACEUTICALS

(75) Inventor: Jerome L. Krupa, Arlington Heights, IL (US)

(73) Assignee: Allscripts, Inc., Libertyville, IL (US)

( * ) Notice: Subject to any disclaimer, the term of this patent is extended or adjusted under 35 U.S.C. 154(b) by 0 days.

(21) Appl. No.: 09/759,875

(22) Filed: Jan. 12, 2001

(65) Prior Publication Data

US 2002/0093189 A1 Jul. 18, 2002

(51) Int. Cl.[7] ................................................ G06K 9/32
(52) U.S. Cl. .................... 235/462.08; 235/385; 283/81
(58) Field of Search ............................. 283/81–82, 93; 40/306, 299, 307, 310, 368, 299.01; 235/462.08, 235/462.12, 494, 462.01, 462.02, 462.07, 235/462.11, 462.25, 385

(56) References Cited

U.S. PATENT DOCUMENTS

| | | | | |
|---|---|---|---|---|
| 3,632,995 | A * | 1/1972 | Wilson | 235/494 |
| 3,711,683 | A * | 1/1973 | Hamisch, Sr. | 235/487 |
| 3,959,624 | A * | 5/1976 | Kaslow | 235/487 |
| 4,372,681 | A * | 2/1983 | Sallenbach | 283/19 |
| 4,540,880 | A * | 9/1985 | Hipko | 235/487 |
| 4,641,347 | A * | 2/1987 | Clark et al. | 705/62 |
| 5,046,609 | A * | 9/1991 | Mangini et al. | 40/310 |
| 5,056,827 | A * | 10/1991 | Sasso | 283/81 |
| 5,123,352 | A * | 6/1992 | Luttrell | 101/375 |
| 5,172,936 | A * | 12/1992 | Sullivan et al. | 283/81 |
| 5,271,642 | A * | 12/1993 | Jahier et al. | 283/81 |
| 5,304,787 | A * | 4/1994 | Wang | 235/462.09 |
| 5,484,996 | A * | 1/1996 | Wood | 235/487 |
| 5,520,990 | A * | 5/1996 | Rotermind | 283/81 |
| 5,704,649 | A * | 1/1998 | Small | 283/81 |
| 5,770,841 | A * | 6/1998 | Moed et al. | 235/375 |
| 5,799,981 | A * | 9/1998 | Tung et al. | 283/81 |
| 5,958,536 | A * | 9/1999 | Gelsinger et al. | 283/81 |
| 6,036,231 | A * | 3/2000 | Foote et al. | 283/81 |
| 6,098,892 | A * | 8/2000 | Peoples, Jr. | 235/494 |
| 6,158,660 | A * | 12/2000 | Blanford et al. | 235/462.11 |
| 6,158,779 | A * | 12/2000 | Petrick | 283/81 |
| 6,167,679 | B1 * | 1/2001 | Horton-Steidle et al. | 53/411 |
| 6,189,936 | B1 * | 2/2001 | Erber et al. | 283/81 |
| 6,196,593 | B1 * | 3/2001 | Petrick et al. | 283/81 |
| 6,260,761 | B1 * | 7/2001 | Peoples, Jr. | 235/462.07 |
| 6,267,296 | B1 * | 7/2001 | Ooshima et al. | 235/487 |
| 6,343,695 | B1 * | 2/2002 | Petrick et al. | 206/534 |
| 6,375,075 | B1 * | 4/2002 | Ackley et al. | 235/462.04 |
| 6,428,640 | B1 * | 8/2002 | Stevens et al. | 156/64 |

(Continued)

FOREIGN PATENT DOCUMENTS

| | | | |
|---|---|---|---|
| DE | 19807232 | C1 * | 2/1998 |

(Continued)

*Primary Examiner*—Diane I. Lee
(74) *Attorney, Agent, or Firm*—Gardner Carton & Douglas LLP

(57) ABSTRACT

A system is provided for dispensing pharmaceuticals or other material dispensed in prepackaged containers. The container includes a symbol such as a barcode to identify the contents of the container. The system uses a label having a first portion having an outer edge and a second portion that extends out from one side and above the top of the first portion. The second portion includes an indicium such as a barcode that is printed on the second portion that describes the desired contents of a container on which the label is intended. The symbol and the indicium are electronically read after the label is affixed to the container to determine if the label is on a container having the identified contents.

9 Claims, 6 Drawing Sheets

U.S. PATENT DOCUMENTS

| | | | | |
|---|---|---|---|---|
| 6,447,014 | B1 * | 9/2002 | Seidl | 283/81 |
| 6,556,690 | B1 * | 4/2003 | Nelson | 382/100 |
| 6,561,426 | B1 * | 5/2003 | Blanford et al. | 235/462.02 |
| 6,599,481 | B2 * | 7/2003 | Stevens et al. | 422/102 |
| 2001/0017817 | A1 * | 8/2001 | De La Huerga | 368/10 |
| 2002/0017784 | A1 * | 2/2002 | Merry et al. | 283/81 |
| 2003/0047616 | A1 * | 3/2003 | Mase et al. | 235/494 |
| 2003/0061750 | A1 * | 4/2003 | Bernier et al. | 40/638 |

FOREIGN PATENT DOCUMENTS

| | | | | |
|---|---|---|---|---|
| DE | 19822751 | A1 * | 9/1999 | G06K 9/18 |
| JP | 01094492 | A * | 4/1989 | G06K 19/00 |

* cited by examiner

SYSTEM AND METHOD FOR ENSURING THE PROPER DISPENSATION OF PHARMACEUTICALS

BACKGROUND OF THE INVENTION

1. Field of the Invention

The present invention relates to labels used on containers, and in particular to a label that is used on a container for pharmaceuticals and the like where the label confirms the contents of the container.

2. Scope of the Prior Art

The most popular method of dispensing pharmaceuticals through prescriptions requires a pharmacist. A pharmacist is trained in various disciplines, including pharmacology, to assist a physician in treating patients using the numerous different pharmaceuticals available in the market. Typically, a physician will examine a patient at a doctor's office or in the hospital and diagnose an ailment or illness. If the ailment can be treated by one or more different pharmaceuticals, the physician will write a prescription or order on a piece of paper, commonly known as a script, and give the script to the patient. The patient then takes the script to any number of pharmacies, including mail-order pharmacies, to be filled. The pharmacist will then review the script and dispense the pharmaceutical according to the doctor's instructions, thereby filling the prescription The script includes the doctor's name, the patient's name, the name of the pharmaceutical prescribed, the dosage, and instructions on how and when to take the pharmaceutical. When the pharmacist renews the prescription, it is often compared with the patient's other prescriptions to ensure that there are no drug interferences and the like with the new prescription. If it is acceptable to dispense the pharmaceutical to the patient, the pharmacist will locate the pharmaceutical from the supply in the pharmacy that corresponds to the prescription and prepare the pharmaceutical for dispensing. Often, the pharmaceutical will require a container, such as pill bottle for liquid. Other pharmaceuticals are dispensed in prepackaged or preassembled boxes and the like for dispensing. For those prescriptions that require bottles of any nature, the pharmacist will put the pharmaceutical in the bottle.

As a part of the dispensing process, the pharmacist will print a label that will have all the relevant information about the written prescription including the patient's name, doctor's name, pharmaceutical's name, dosage, and instructions for taking the pharmaceutical. Other information, such as general information about the pharmaceutical, can also be prepared for the patient. Once the pharmacist has completed preparing the container, if one is necessary, the label is attached to the specifically filled container or to the preassembled container, and dispensed to the patient. In order to ensure that the correct pharmaceutical is dispensed to the patient, the pharmacist has a variety of systems and methodologies to check the dispensing process. In addition, many types of dispensing assistance systems have been developed to aid the pharmacist in correctly and efficiently dispensing pharmaceuticals according to physician's instructions. Many of those dispensing assistance systems use a computer, and other equipment, as a primary component.

It is also possible for a prescription to be filled by a physician at the physician's office. For example, this occurs when a physician gives a patient a sample. In many jurisdictions, a physician can also dispense pharmaceuticals in much the same manner as a pharmacist does. In order to assist physician offices in dispensing pharmaceuticals, various different systems have been developed, including the TouchScript™ System by Allscripts, Inc., the assignee of this application. Systems like the TouchScript System use a computer system to generate a prescription that will then be filled by any number of different dispensing units including the physician's office, a local pharmacy, a mail-order pharmacy, an Internet-based pharmacy, and the like.

To use the computer-based system to write a prescription, the system is designed to prompt the physician to obtain all the necessary information for the prescription. The system can be designed so that many different physicians in one office can use it. To start, the physician initiates the system by using the required logon sequence. As a part of the logon sequence, the physician uses a specific identification code so that only those individuals permitted to write prescriptions use the system. Once the physician has logged onto the system and it is confirmed that the physician is an authorized user, the physician is prompted to write the prescription. Such prompts can be menu-based or any other type of now known or future known types of programming techniques.

The system initially prompts the physician for the name of the patient, The patient's name can be filled in by using a keyboard or the like, or the name can be selected from a list of current patients or patients scheduled for the day. Once the patient is selected, the computer system accesses the patient's prescription records, if available, and other patient information such as insurance information and other relevant health information. The information accessible to the physician depends on the information available, the configuration of the computer system and the accessibility of the information. If prescription information is available, the physician can select a previously written prescription or write a new prescription. If a previously written prescription is to be renewed, the system prompts the physician; the prescription is prepared using the information already entered into the system by the physician. A script can then be printed to be filled by an outside pharmacy, or the physician's office can access the new prescription record and the office can fill the prescription.

If the physician needs to write a new prescription, computer systems have been designed to obtain all the necessary information. As stated, the system has already obtained the physician's and patient's names. The system can be configured to obtain the diagnosis of the patient. Accordingly, the physician is prompted to input that diagnosis, or to select the diagnosis from a list of commonly made diagnoses for that physician or patient. Once the diagnosis is selected, the system can limit the number of available pharmaceuticals to those that are commonly used to treat the diagnosis. The physician then chooses one of the listed pharmaceuticals. Of course, the physician can override the pharmaceutical selections offered by the system or can select a pharmaceutical without having to enter a diagnosis into the system. When the pharmaceutical is selected, the system is configured to enter in the other relevant information for the prescription, such as the dosage and instructions for when and how to take the pharmaceutical.

Once the prescription is complete and it is the physician's office that will dispense the pharmaceutical, the prescription record will be accessed. Typically, the physician's office is stocked with pharmaceuticals predispensed into containers such that the containers are filled with the most common pharmaceuticals, dosages, and instructions. The container has a preapplied label on it that indicates its contents. In this scenario, the correct container is selected for the prescription and given to the patient. In order to make sure that the patient has all the correct information about the prescription and the pharmaceutical, a label for the bottle and relevant information are printed. The label and the pharmaceutical information can be printed on one sheet of paper that is designed for this purpose and generally has rectangular labels on the top portion of the paper. The remainder of the paper can be any sort of paper. When the prescription information is printed, the prescription label is removed and applied to the container. The container can be configured with a pattern on it so that the label is correctly applied thereto. The container and the remainder of the paper are given to the patient.

For inventory control purposes at the physician's office, the computer-based dispensing system uses coded predispensed containers, which are coded using barcodes or other known and to be developed types of electronically readable codes. The barcodes can be designed to indicate multiple features of the container and the pharmaceutical, such as the contents of the container, the expiration of the pharmaceutical, the lot number, and other relevant information. In order to read the codes, a barcode reader, or other suitable device, is installed at the physician's office. When the physician's office dispenses the pharmaceutical, the dispenser uses the barcode reader to read the barcode on the container so that the inventory portion the system will deduct the container from the inventory.

With the various systems available, it is not possible to verify that the label is placed on the bottle containing the pharmaceutical prescribed and mentioned on the script. Such a mechanism would ensure that the dispenser chose the correct pharmaceutical from those available. Within the constraints of presently available systems, the dispenser checks the container and the label to ensure that everything is dispensed properly. The patient can also check the container and the label.

Barcodes also have many other applications for medical purposes beyond dispensing pharmaceuticals. One such barcode application is for ensuring the drawn blood is identified to the correct patient or donor. In such an application, one barcode number is designated for a patient/donor and a series of barcodes corresponding to that number are printed. The series of barcodes can be printed on a number of labels so that each label can be applied to the number of items, such as vials, pouches, forms, etc. The barcodes are then read at various times to ensure that the vial, pouch, form, etc. is correct and to verify that an item has not been lost or misplaced.

The system of using the series of barcodes having the same code and applied to various different items can be used for other purposes, such as inventory control and tracking an item through a manufacturing process. In those applications and processes, many items have been designated with codes that are written in an electronically readable format. It would be beneficial that when products are modified in any way and new codes given to a product, which are commonly given designated in barcodes, where a new barcode or label is applied to the product that a mechanism be developed to check that the label and the product correspond. Such arrangements are useful for quality control, inventory, and other purposes.

SUMMARY OF THE INVENTION

The present invention is directed to a design of a label that can be applied to a container or product that has a barcode on it so that it can be verified and the label is applied to the correct container or product. The present invention also relates to a system that dispenses pharmaceuticals using a label designed to check that the label is placed on the correct pharmaceutical container. The label and system of the present invention can be used with other medical and non-medical containers and dispensing systems.

The label of the present invention can be applied to any type of container, such as a pill bottle, liquid bottle, or any type of prepackaged bottle or box. Typically, the container used with the present invention includes a written description of the contents of the container and can include a symbol, such as a barcode or the like, also designating the contents of the bottle. The symbol can include other relevant information about the product, such as lot numbers and expiration dates. The label includes a first portion that has an outer edge. Preferably, the first portion is rectangular. The first portion is typically large enough so that the relevant information about the container's contents can be included on the label. For a prescription, the first portion includes the patient's name, doctor's name, name of the pharmaceutical, and instructions for taking the pharmaceutical.

The label also includes a second portion that extends out from the outer edge of the first portion to form a tab-like portion on the label. The size of the second portion is large enough to hold a barcode, or other type of indicium, which corresponds to the desired content of the container. In the preferred embodiment, the second portion extends from an upper corner of the first portion such that it extends out from the side and the top edges of the first portion. The second portion is designed so that when it is placed on the container the indicium inscribed on it aligns with the symbol printed on the container. Thus, a barcode reader, or other reading device, simultaneously reads the symbol and the indicium to ensure that the label corresponds to the contents of the container.

The label of the present invention is used as a part of a prescription dispensing system and can be used with other sorts of dispensing, inventory, or management systems now known or to be developed. The prescription dispensing system of the present invention can be used by a physician to generate a script for a patient and where the physician's office dispenses the prescribed pharmaceutical directly to the patient. The prescription dispensing system can also be used by any entity that dispenses pharmaceuticals, such as pharmacies, mail-order pharmacies, Internet pharmacies, and the like. As is known in the art, a physician generates a script using the prescription dispensing system and then the prescribed pharmaceutical is dispensed directly to the patient. To dispense the desired pharmaceutical, the prescription is accessed by the system and the predispensed container of the pharmaceutical is taken from the inventory. As described, the container includes a barcode or other symbol that can be electronically read and that indicates at least the contents of the container. For inventory and other management purposes, the barcode on the container is scanned.

In addition, a label of the present invention is printed for the container. The label can be separately printed or can be a part of a sheet that includes the label and other information about the prescription, such as general information about the pharmaceutical and the cost information. The label is then affixed to the container, preferably in such a way that the second portion aligns with the barcode on the container. The container can be configured with lines or other methods to assist one in correctly orienting the label on the container.

Once the label is properly placed on the container, the container is scanned again. During this scan, both the barcode on the container and on the second portion are scanned simultaneously. The barcode reader and the system are programmed using known technologies to make sure that the contents described on the label correspond to the contents supplied in the container. This is achieved by generating an indicium during the label generation stage that corresponds to the prescribed pharmaceuticals, indicium should, by definition, correspond to the symbol on the container. If the barcode on the container and the barcode on the second portion correspond to one another, then the container is ready for dispensing to the patient. If they do not correspond, then the dispenser is required to correctly determine if the label and the contents of the container correspond. This can be done manually or by using the dispensing system.

In the preferred embodiment, the barcode on the second portion is created as a checksum of the barcode on the container. Other means of ensuring that the barcode on the second portion corresponds to the one on the container can be used.

These and numerous other features and advantages of the present invention will become readily apparent from the following description, the accompanying drawings, and the appended claims.

DETAILED DESCRIPTION OF THE PREFERRED EMBODIMENT

Figure 1:
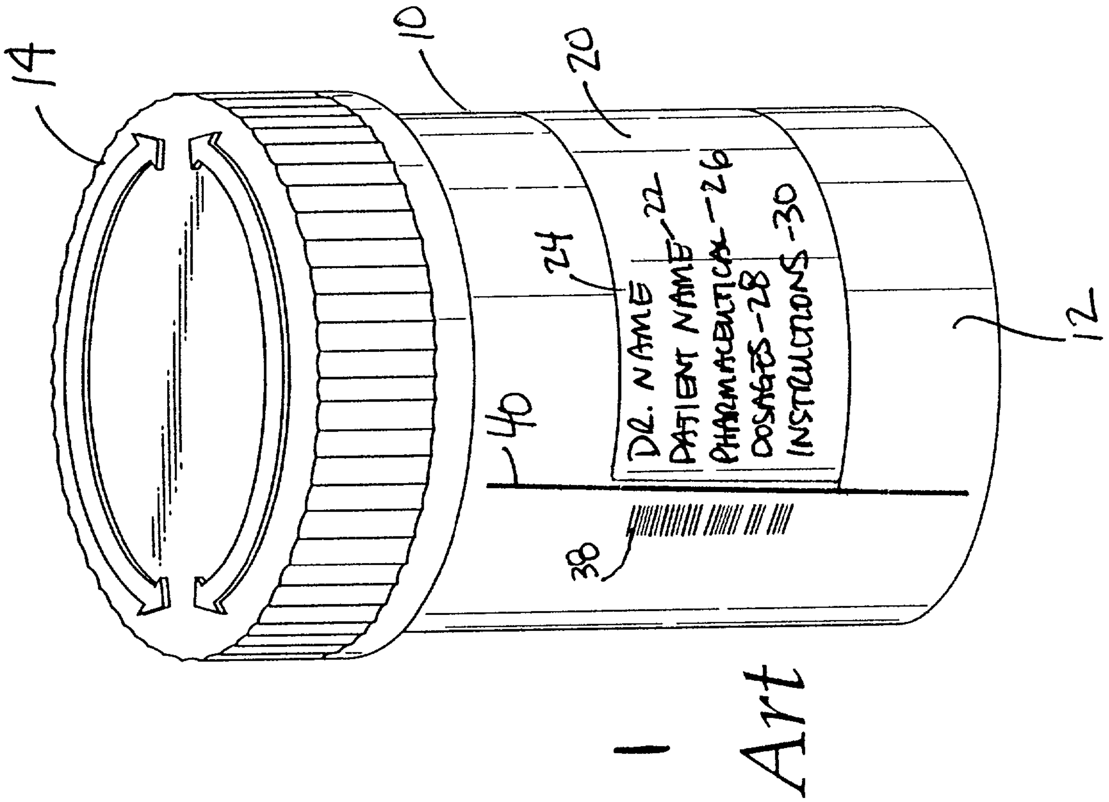
Fig. 1 Prior Art
FIG. 1 illustrates a pill bottle that includes a label of the prior art.

A prior art pill container 10 that is used to dispense pharmaceuticals in known manners and in accordance with the principles of the present invention is shown in FIG. 1. The pill container includes a vessel 12 and a cap 14. The vessel 12 is generally cylindrical having a closed end 16 and an open end 18 that can be closed by the cap 14 The cap 14 can be threaded onto the open end 18 of the vessel 12; or any of the known types of child-safety configurations can be used thereby ensuring that cap 14 is not easily removed by a child.

When a pharmacist prepares the pill container to dispense a pharmaceutical, the pharmacist follows the instructions found on a script or order prepared by a physician. As is well known, the pharmacist selects the prescribed pharmaceutical from an inventory and places the correct number of pills in the vessel 12 or dispenses the correct amount of liquid into a suitable vessel, such as that shown in FIG. 6, and closes the vessel 12 with the cap 14. The pharmacist also prints out a label 20 that is placed on the container 10. Typically, the label 20 contains the patient's name 22, the doctor's name 24, the name of the pharmaceutical 26, the dosage 28 and the instructions 30. Other information may also be included. As seen in FIG. 1, the prior art label 20 is rectangular and fits on the outer surface of the container 10. Of course, the different types of the containers 10 and shapes of the prior art labels 20 are known.

Figure 2:
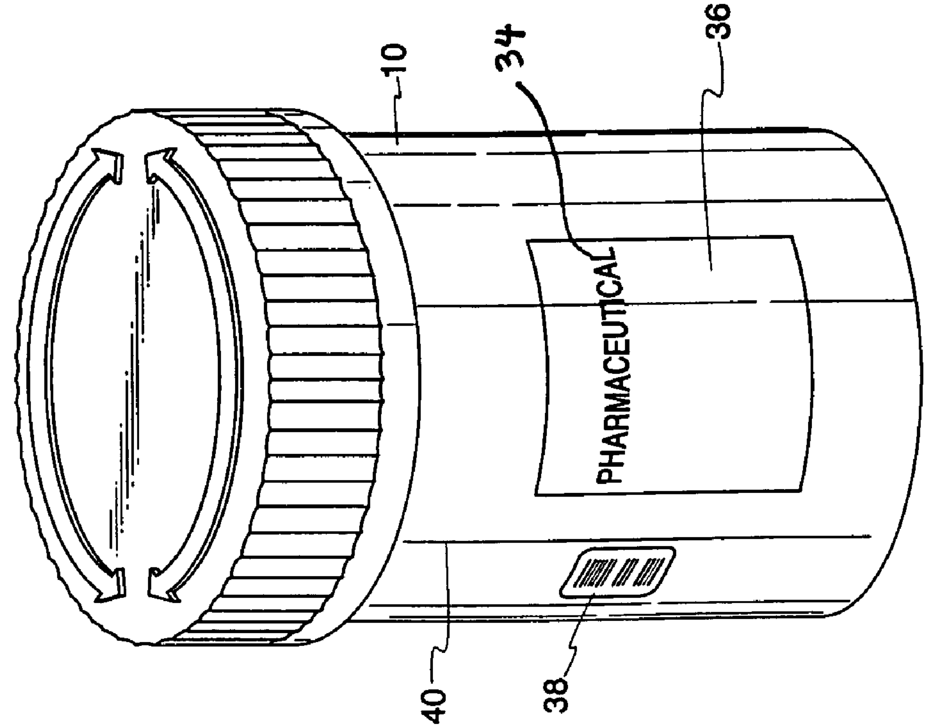
Fig. 2 Prior Art
FIG. 2 illustrates a pill bottle used by the label of the prior art and the label of the present invention.
Figure 3:
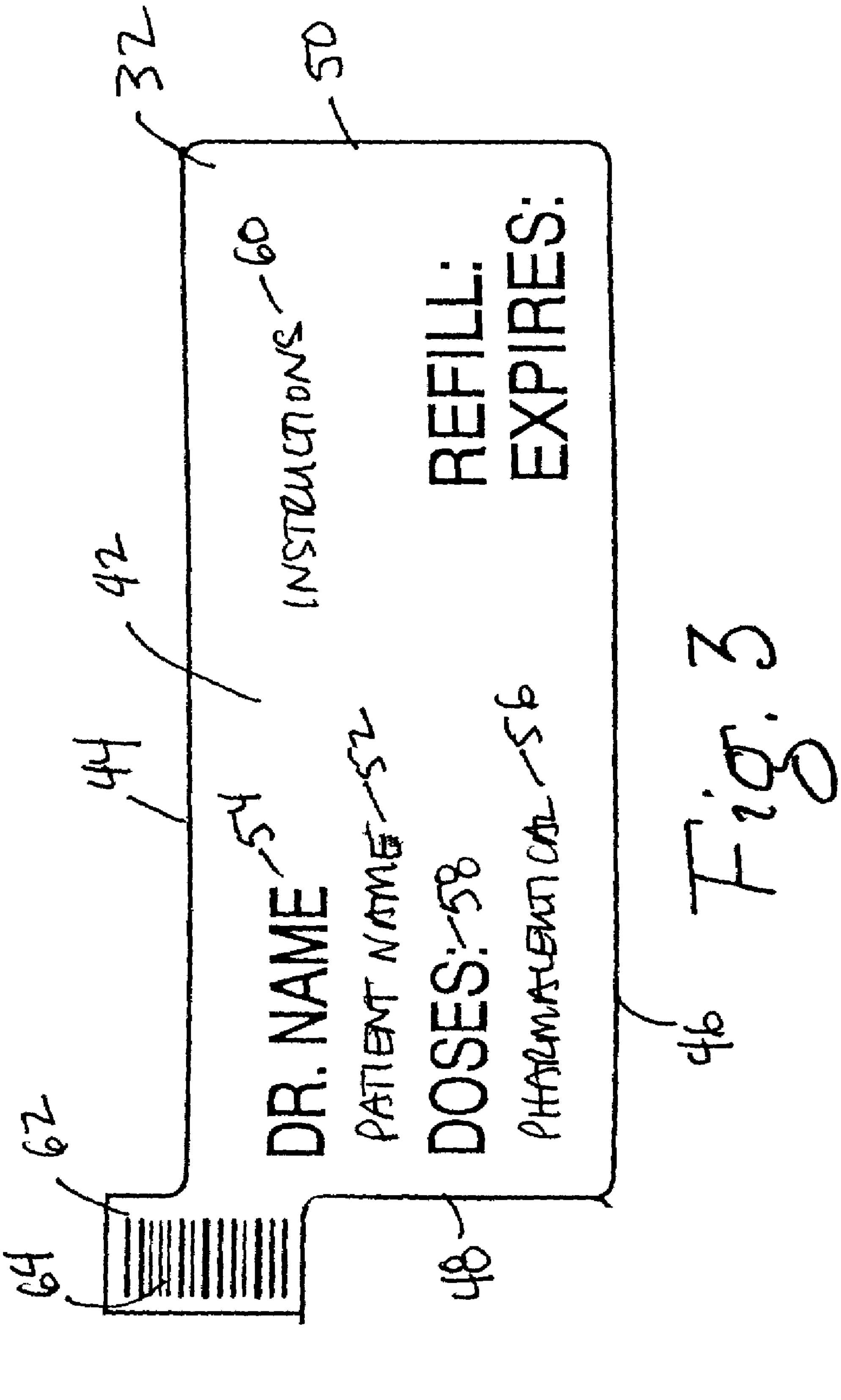
FIG. 3 illustrates a label made in accordance with the principles of the present invention.

The container 10 shown in FIG. 2 can be used with the prior art label 10 or the label 32 of the present invention, which is illustrated in FIG. 3. For use in the present invention, the container 10 is commonly prepackaged with a given number of pills at a specific dosage, for example thirty 800 mg ibuprofen pills. The relevant information 34 corresponding to the contents of the container is printed on a label 36, referred to as the initial label, that is affixed to the outer surface of the container. The initial label 36 also includes a barcode 38 that designates the contents of the prepackaged container 10. In addition, the barcode 38 can include other types of relevant information about the prescription such as lot numbers, expiration dates and the like. Because of the configuration of the initial label 36 and the information that is printed on it, the barcode 38 is typically oriented vertically, or longitudinally, on the initial label 36. While a barcode is the most common form of symbol used, other types of symbols currently known or that will be developed in the future, can also be used. As the container 10 will need another label before the pharmaceutical can be properly dispensed to a patient, the initial label 36 includes an orientation line 40 to assist the dispenser in positioning the subsequent label. For the present invention, it is preferable to have the orientation line 40 in proximity to the barcode 38.

The label 32 of the present invention is designed to be used with an initial label 34, but this is not required. Accordingly, when the label is affixed to the container 10 having the initial label 34, it is possible to electronically verify that the label 32 has been affixed to a container 10 that has been prepackaged with the pharmaceutical designated by the label 32. The label 32 includes a first portion 42 that is similar to the label 20 known in the prior art. In the preferred embodiment, the first portion 42 is generally rectangular and has a top edge 44, a bottom edge 46, and side edges 48 and 50. Like the prior art label 20, the first portion 42 can contain the necessary information about the prescription including the patient's name 52, the doctor's name 54, the name of the pharmaceutical 56, the dosage 58, and the instructions 60 for taking the pharmaceutical.

As seen in FIG. 3, the label 32 also includes a second portion 62. The second portion 62 extends out from one side edge 48 of the label 32 in the form of a tab. As will be described in more detail below, the second portion 62 extends out from an edge of the first portion 42 so that the second portion can be positioned relative to the symbol 38 on the container 10. In the preferred embodiment, the second portion 62 also extends above the top edge 44. As seen, the second portion 62 is positioned to extend out and away from the upper left-hand corner of the first portion 42. Of course, the second portion can be positioned elsewhere and still be within the scope of the present invention.

The second portion is large enough to have an indicium 64 printed thereon that corresponds to the contents of the container 10, such as the pharmaceutical 56. The second portion is large enough so that the indicium 64 can store enough relevant information about the pharmaceutical 56 in the prescription. In the preferred embodiment, the indicium 64 is a barcode, but other types of indicia currently known or that will be developed in the future, can also be used. It is preferable that the type of indicium 64 corresponds to the symbol 38 used on the initial label 36.

Figure 4:
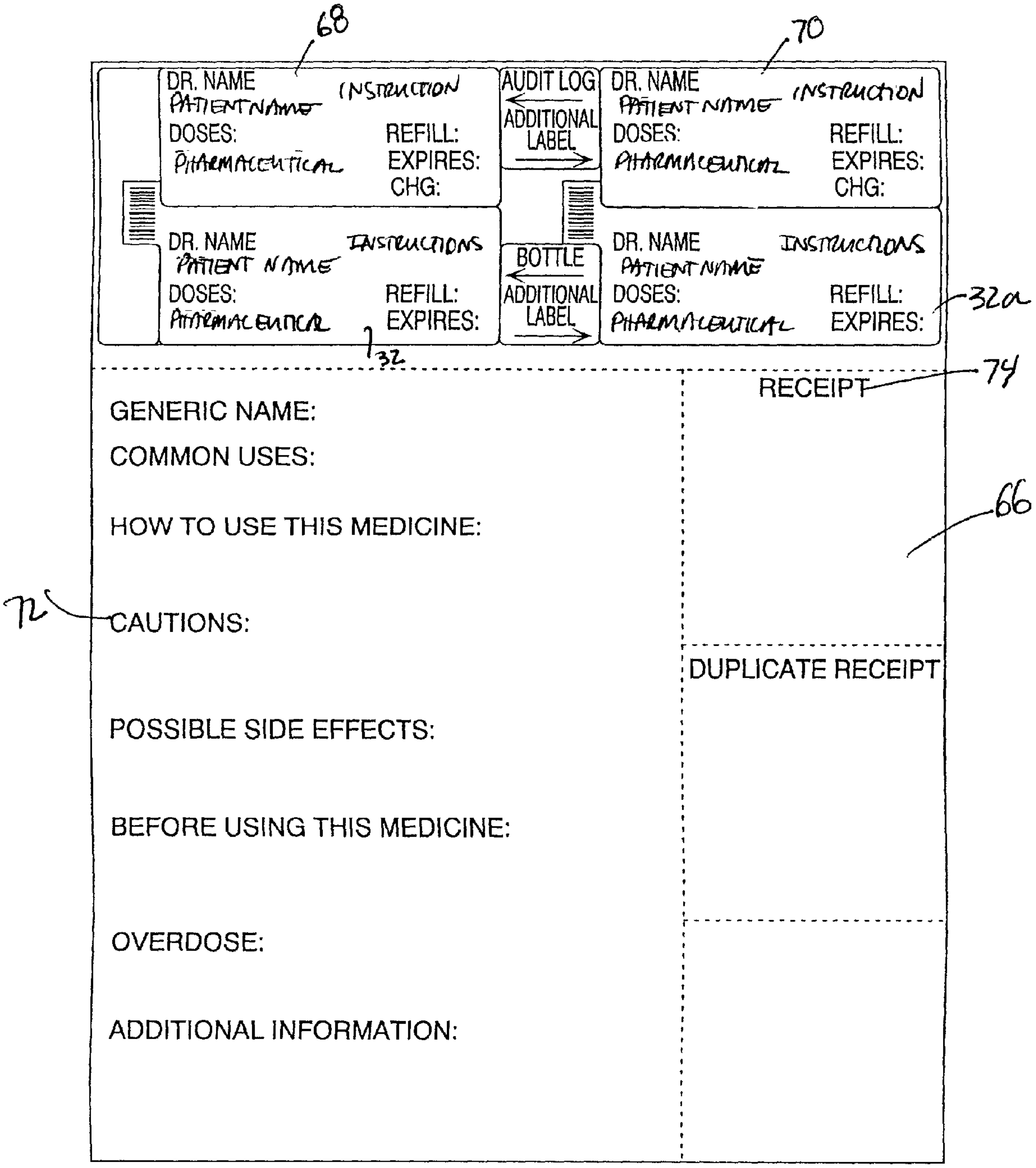
FIG. 4 illustrates a paper sheet that includes the label of the present invention.

The label 32 can be part of a sheet 66, as seen in FIG. 4, that is printed when the pharmaceutical is dispensed. The sheet 66 includes at least one label 32 to be affixed to the container 10. An additional label 32*a* can be included on the sheet 66 for use if a printing or affixing error occurs. The labels 32 and 32*a* include both the first portion 42 and second portion 62. The sheet 66 can also include additional labels 68 and 70, such as an audit label and the like, which can be used for dispensing, inventory, audit, and other purposes. The labels 32, 32*a*, 68, and 70 are typically positioned on the upper portion of the sheet 66. As is known in the art, the labels 32, 32*a*, 68, and 70 have an adhesive on the back and at least the upper portion of the sheet 66 is paper known in the art from which the labels are easily removed so as not to destroy the adhesive.

The lower portion of sheet 66 can be divided into different sections for other relevant information for use by the patient. A large portion of the sheet can be devoted to information 72 about the prescribed pharmaceutical, such as instructions, side effects, ingredients, etc. Another portion can be for the patient's receipt 74.

Figure 5:
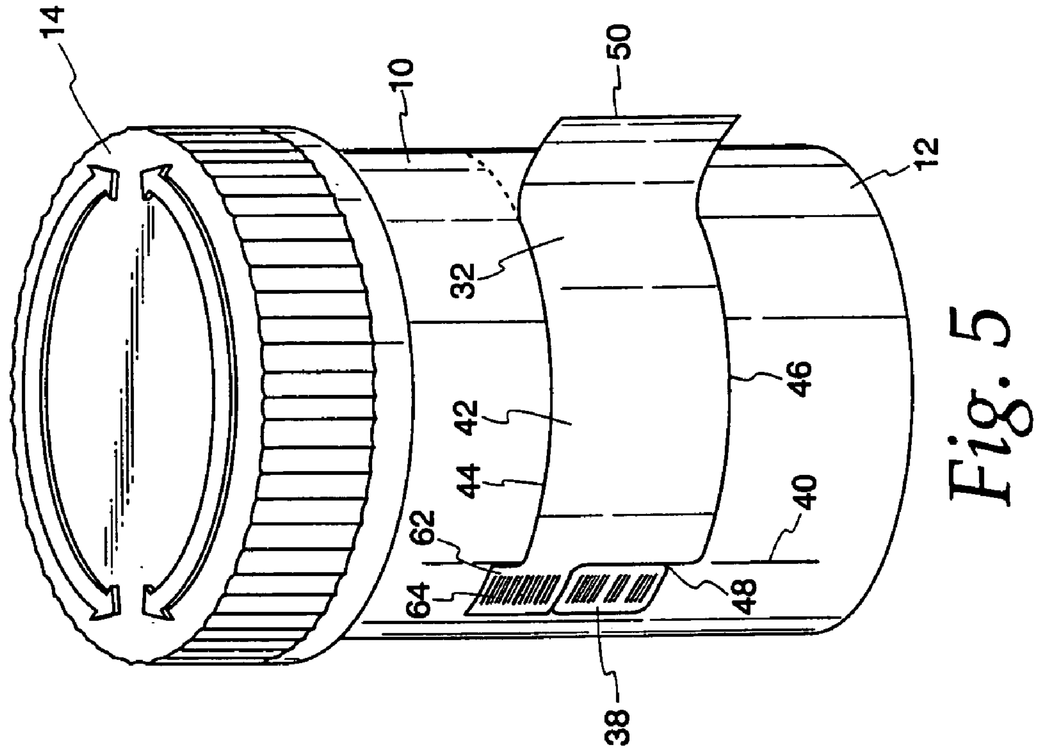
FIG. 5 illustrates a pill bottle having a label of the present invention affixed thereto.

The label 32 of the present invention is intended to be affixed to the container 10 shown in FIG. 3. As seen in FIG. 5, the label is placed on the container such that the side edge 48 is aligned with the orientation line 40. Thus, the second portion 62 will extend over at least a portion of the orientation line 40. The position of the second portion 62 vertically aligns with the barcode 64 with the barcode 38 on the container 10.

Figure 6:
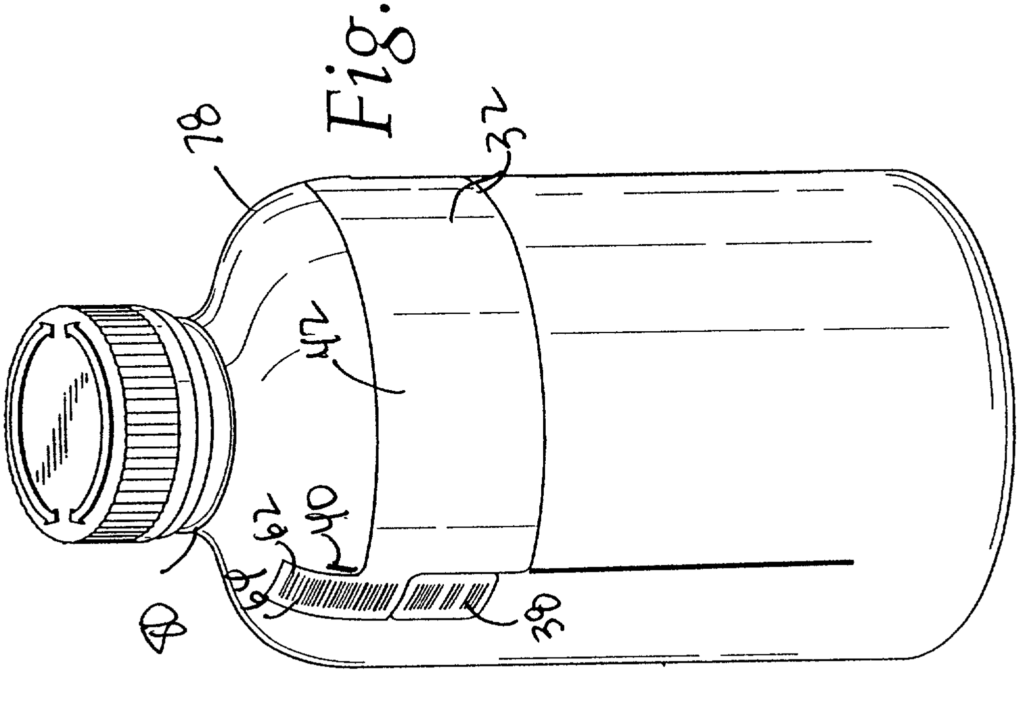
FIG. 6 illustrates a liquid bottle having a label of the present invention affixed thereto.

FIG. 6 illustrates the label 32 of the present invention being used on a liquid bottle 78. The liquid bottle 78 has a neck portion 80, and the second portion 62 can extend into the neck portion 80. As seen, the neck portion 80 causes the second portion 62 and the barcode 64 to bend to the shape of the bottle 78. Even in this configuration, it has been found that the barcode reader 76 can read both barcodes 38 and 64 when the second portion extends into the neck portion 80.

Figure 7:
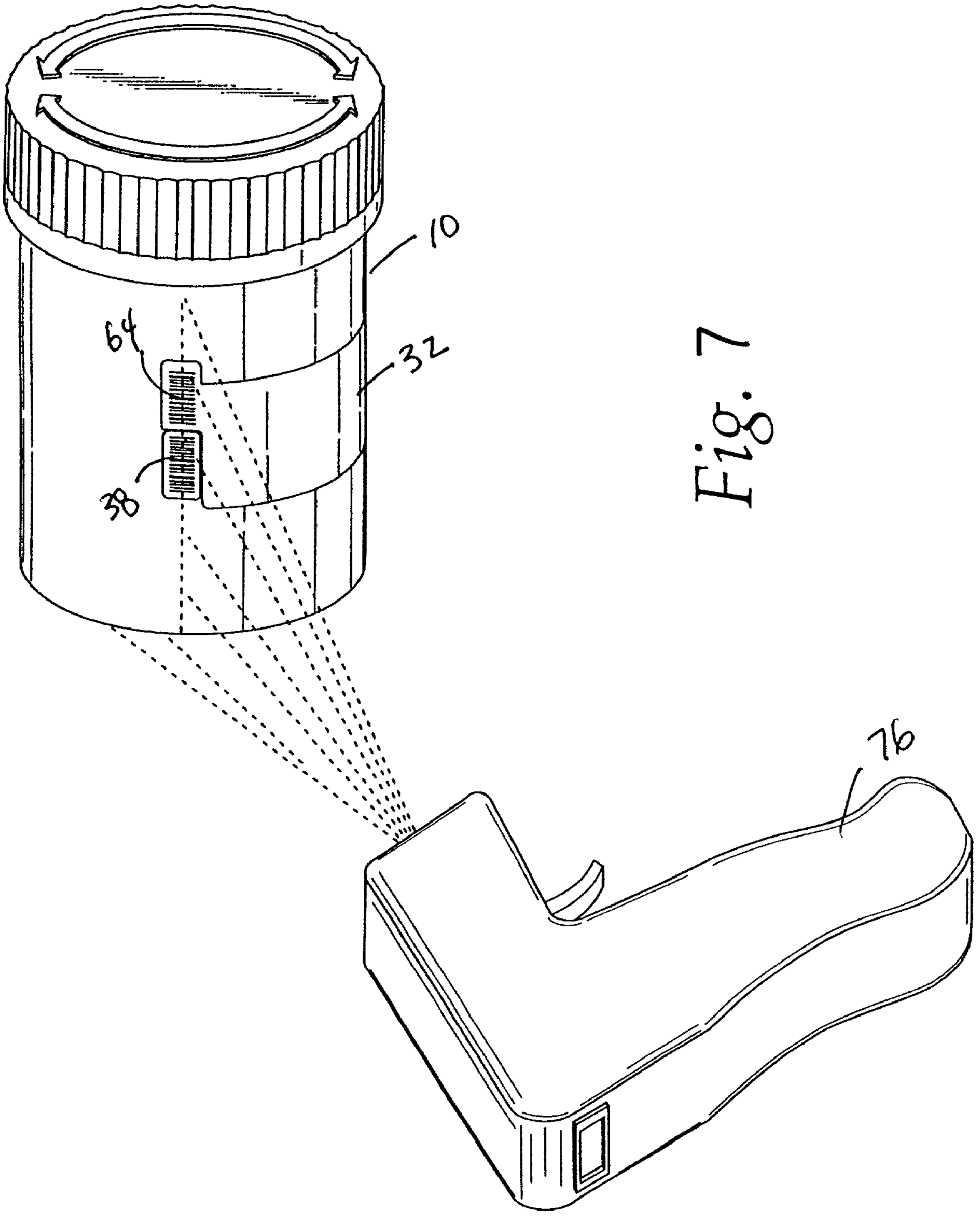
FIG. 7 illustrates a container having a label of the present invention affixed thereto where the barcodes are being electronically read by a scanner.

The position of the barcodes 38 and 64 on the container 10 allows a barcode reader 76 to read both barcodes simultaneously, as seen in FIG. 7. By reading the barcodes 38 and 64, it is possible to verify that the label 32 is placed on a container 10 that is filled with the pharmaceutical corresponding to the one indicated on the label 32. It is also possible that the barcodes 38 and 64 can be arranged in different places on the container and that the barcode reader 76 can still read the barcodes to ensure that the label 32 and the pharmaceutical in the container correspond. The barcode reader 36 used by the present invention is manufactured by Symbol Technologies, Inc. of Bohemia, N.Y. The barcode reader 36 for the present invention can be configured to the codes simultaneously check that the barcode 64 corresponds to the barcode 38.

Figure 8:
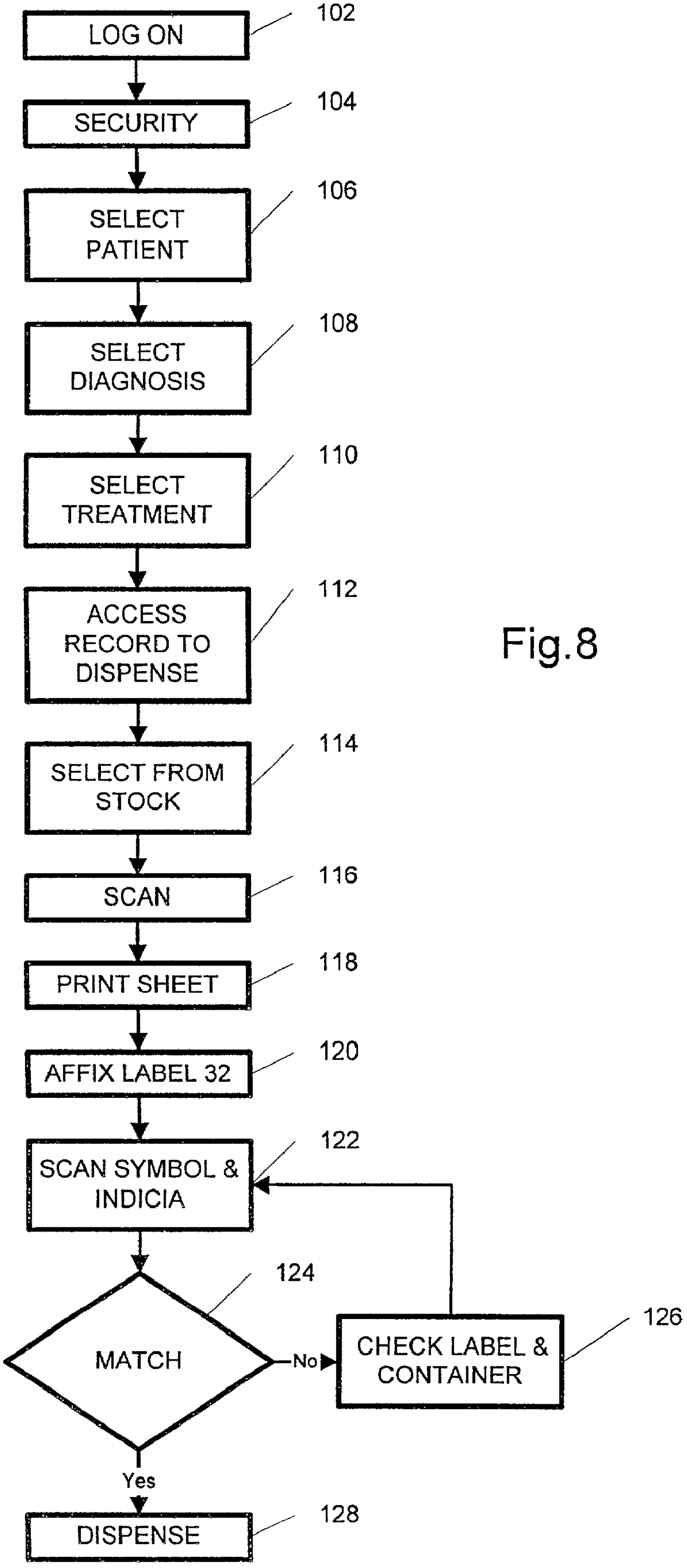
FIG. 8 is a flow chart of a prescription generation and dispensing system that uses the label of the present invention to dispense pharmaceuticals.

The label 32 of the present invention can be used as part of a prescription generation and dispensing system, such as Allscript's TouchScript System. FIG. 8 is a flow chart of the steps taken by a physician and in a physician's office to create the script and dispense the pharmaceutical. The prescription generation and dispensing system 100 shown in FIG. 8 is a computer-generated system and is generally known in the art. In one configuration of the system 100, a terminal is installed in an examination room or at another central location for use by the physician to generate a prescription. In another configuration, the physician has a hand-held computer terminal. The examination installed terminal or the hand-held computer is connected through known means, such as infrared technology or cabling, to a central computer system that handles administrative and dispensing functions for the system 100.

To begin using the system 100, the physician logs into the system 100 in step 102. The system can be configured with a security step 104, which requires the physician to input a password, so that only authorized personnel can use the system 100. Once the physician is authorized to use the system, the physician is prompted using menus or other known and to be developed methods to "write" the prescription. The physician continues and selects the patient for whom the prescription is to be written in step 106. The physician enters the patient from a list of all patients available, from a list of patients scheduled to be seen by the office or the physician on that day, or writes in a new patient. In step 108, the physician selects a diagnosis to be treated. The physician selects the diagnosis from a list of all available diagnoses, from a list of common diagnoses for the patient, from a list of commonly used diagnoses by the physician or the physician's office, or the physician can write in a new diagnosis. The system 100 can be configured with the correct ICD9 code for that diagnosis.

When the diagnosis is selected, the physician selects the correct treatment for the patient's diagnosis. If a prescription is to be written, the physician selects a pharmaceutical, or medication, in step 110. The pharmaceutical can be selected from a list of medications to common to that patient, a list of medications common for the diagnosis, a list of medications in stock, or any other medication available. The system 100 can be programmed to give the physician a short list of pharmaceuticals that the physician prefers to use to treat a patient or an illness. Once the pharmaceutical is chosen, the physician completes the script, such as the dosage and instructions on when to take the pharmaceutical. With this information, the prescription is generally complete.

When the prescription is complete, the pharmaceutical can be dispensed. If the pharmaceutical is to be filled by a pharmacy outside the physician's office, the system 100 generates a paper script for the patient or sends the script electronically directly to the pharmacy. If the physician's office is to dispense the pharmaceutical directly to the patient, the office is usually configured with a dispensing terminal that can access the system 100. The dispensing terminal is proximate to the physical location where the prepackaged and preassembled containers 10 are stored. When the dispenser, which can be the physician, a nurse, or other authorized personnel, is ready to dispense the pharmaceutical, the dispenser accesses the patient's record and selects the prescription to be dispensed in step 112. Next, the dispenser takes the corresponding pharmaceutical from the available stock in step 114. The dispenser takes the prepackaged container that has the correct number of pills at the correct dosage for the prescription. In step 116, the dispenser uses the barcode reader to scan the barcode 38 on the container 10. The system 100 uses the information from the barcode 38 to update inventory records and to perform other administrative functions. The system also uses the information from step 116 to ensure that the correct pharmaceutical is dispensed to the patient.

After the container's barcode 38 has been scanned, the system prints the sheet 66, including labels 32, 32*a*, 68, and 70, information 72, and receipt 74 in step 118. On the labels 32 and 32*a*, the system 100 prints the barcode 68 on the second portion 62. In order to check that the label 32 corresponds to the pharmaceutical in the container 10, the barcode 64 is generated so that it corresponds to the prescribed pharmaceutical. In the preferred embodiment, the system 10 generates a barcode that corresponds to the checksum of the barcode 38 on the container 10. As the physician's office receives inventory of containers having prepackaged pharmaceuticals, the system receives the necessary information regarding the barcodes on the received containers 10. When the system is used to generate a prescription, the system generates a checksum for the prescribed pharmaceutical using the known barcode values provided to the system 100. The barcode 64 that is printed on the labels 32 and 32*a* corresponds to the system-generated checksum. In the preferred embodiment, the barcode 64 is a six-digit code. It has been found that having six digits is sufficient to include enough information within barcode 64 to ensure that the label 32 corresponds to the contents of the container 10. Of course, methods other than generating checksums can be used to ensure that the correct label is used.

In step 120, the dispenser removes label 32, or if necessary label 32*a*, and affixes it to the container. As described above, the side 48 is aligned with the orientation line 40 provided on the container 10. Thus, the barcode 64 is vertically aligned with the barcode 64.

In step 122, the dispenser uses the barcode reader 76 to scan the barcodes 38 and 64. The reader 76 is programmed to read both barcodes 38 and 64 simultaneously. In addition, the system 100, including the reader 76, checks to see that the barcode 64 corresponds to the barcode 38, thus ensuring that the label 32 for the pharmaceutical is placed on a container 10 having the prescribed pharmaceutical. As described, any number of known methods, including where the barcode 64 is a checksum of the barcode 38, can be used to check that the label 32 is placed on the correct container 10. If, in step 122, the barcodes 38 and 64 do not correspond, the routine continues to step 126 where the system 100 indicates that the label 32 does not correspond to the pharmaceutical contained in the container. Thus, in step 126, the dispenser is instructed to check to determine if the label or the container is correct for the patient's prescription. After an appropriate correction is made, the routine returns to step 122 and the dispenser rescans the barcodes 38 and 68 to ensure that the label 32 corresponds to the pharmaceutical in the container 10. Also, if necessary, the dispenser then collects reimbursement from the patient in step 126. Finally, when it is confirmed in step 124 that the barcodes 38 and 64 correspond, the routine continues to step 128 where the container is dispensed to the patient.

Although the present invention has been described in considerable detail with reference to certain preferred versions, other versions are possible, therefore, the spirit and scope of the appended claims should not be limited to the description of the preferred embodiment described.

What is claimed is:

1. A packaging system for pharmaceuticals, the packaging system comprised of:

a container having a symbol that represents a pharmaceutical stored in the container; and a single-layer label having a first side and a second side with the second side attached directly to a surface of a container, the single-layer label including:

a first portion having an outer boundary;

a second portion extending out and away from the outer boundary of the first portion; and an indicium, inscribed on the second portion, identifying at least a pharmaceutical that has been prescribed to a patient;

the indicium aligned with the symbol so as to allow both the symbol and the indicium to be scanned together by a detector in order to confirm that the prescribed pharmaceutical matches the contents of the pharmaceutical container.

2. The system of claim 1, wherein:

the first portion and the second portion of the single-layer label are generally rectangular in shape;

the second portion extends out and away from a side of the first portion, the side of the first portion having a first length; and a side of the second portion that is contiguous with the side of the first portion has a second length that is shorter than the first length.

3. The system of claim 1, wherein, the second portion extends outward from a corner of the first portion.

4. The system of claim 1, wherein the second portion and symbol are shaped so that the second portion may cover part of the symbol while allowing for simultaneous scanning by a detector.

5. The system of claim 1, wherein:

the symbol and the indicium are bar codes; and the detector is a bar code scanner.

6. The system of claim 1, wherein the first portion of the single-layer label contains information regarding the prescription.

7. The system of claim 1, wherein at least part of the label is transparent.

8. The system of claim 1, wherein the indicium is a checksum of the symbol.

9. The system of claim 8, wherein the checksum includes a check digit of the checksum.

* * * * *